(12) United States Patent
Yanase

(10) Patent No.: US 11,498,206 B2
(45) Date of Patent: Nov. 15, 2022

(54) ENTERTAINMENT SYSTEM, ROBOT DEVICE, AND SERVER DEVICE

(71) Applicant: Sony Interactive Entertainment Inc., Tokyo (JP)

(72) Inventor: Kazuhiro Yanase, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 178 days.

(21) Appl. No.: 16/769,381

(22) PCT Filed: Dec. 14, 2017

(86) PCT No.: PCT/JP2017/044991
§ 371 (c)(1),
(2) Date: Jun. 3, 2020

(87) PCT Pub. No.: WO2019/116521
PCT Pub. Date: Jun. 20, 2019

(65) Prior Publication Data
US 2020/0290198 A1    Sep. 17, 2020

(51) Int. Cl.
*G05B 19/418* (2006.01)
*B25J 9/00* (2006.01)
*B25J 13/00* (2006.01)

(52) U.S. Cl.
CPC .......... *B25J 9/0084* (2013.01); *B25J 13/006* (2013.01)

(58) Field of Classification Search
CPC ...... B25J 11/001; B25J 11/003; B25J 13/006; B25J 9/0084; A63H 11/00; A63H 30/04;
(Continued)

(56) References Cited

U.S. PATENT DOCUMENTS 8,583,287 B2   11/2013  Kase
8,706,295 B2    4/2014  Park
(Continued)

FOREIGN PATENT DOCUMENTS

JP    1999126017 A    5/1999
JP    2000252960 A    9/2000
(Continued)

OTHER PUBLICATIONS

International Preliminary Report on Patentability and Written Opinion for corresponding PCT Application No. PCT/JP2017/044991, 20 pages, dated Jun. 25, 2020.
(Continued)

*Primary Examiner* — Harry Y Oh
(74) *Attorney, Agent, or Firm* — Matthew B. Dernier, Esq.

(57) ABSTRACT

An entertainment system includes: a robot device capable of acting in an autonomous action mode in a real world; a server device configured to cause a virtual robot associated with the robot device to act in a virtual world; and a terminal device capable of displaying an image of the virtual world in which the virtual robot acts. The server device provides the image of the virtual world to the terminal device. The server device transmits a request from the virtual robot to the robot device. When the robot device acquires the request from the virtual robot, the robot device acts in a collaboration action mode in which collaboration is made with the virtual robot.

10 Claims, 8 Drawing Sheets

(58) Field of Classification Search
CPC ........ A63F 13/327; A63F 13/35; A63F 13/58; A63F 13/825
See application file for complete search history.

(56) References Cited

U.S. PATENT DOCUMENTS

| | | | |
|---|---|---|---|
| 10,510,189 B2 | 12/2019 | Numaguchi | |
| 2002/0022507 A1* | 2/2002 | Dan | A63F 13/424 463/1 |
| 2012/0150352 A1* | 6/2012 | Park | B25J 13/006 700/264 |
| 2013/0103196 A1* | 4/2013 | Monceaux | A63F 9/183 700/253 |
| 2013/0123987 A1 | 5/2013 | Kase | |
| 2014/0273717 A1* | 9/2014 | Judkins | A63H 3/006 446/175 |
| 2014/0274313 A1* | 9/2014 | Bala | G06Q 30/06 463/25 |
| 2016/0257000 A1* | 9/2016 | Guerin | B25J 9/1605 |
| 2017/0024934 A1* | 1/2017 | Numaguchi | A63F 13/65 |

FOREIGN PATENT DOCUMENTS

| | | |
|---|---|---|
| JP | 2008253362 A | 10/2008 |
| JP | 2011121171 A | 6/2011 |
| WO | 2012172721 A1 | 12/2012 |
| WO | 2015159561 A1 | 10/2015 |

OTHER PUBLICATIONS

Notice of Reasons for Refusal corresponding JP Application No. 2019558815, 9 pages, dated Jul. 20, 2021.

International Search Report for corresponding PCT Application No. PCT/JP2017/044991, 4 pages, dated Mar. 13, 2018.

Hashimoto, Sunao et al., "TouchMe: Direct Manipulation for Robot Based on Augmented Reality. Interaction Papers 2011" Information Processing Society of Japan, 11 pages, Mar. 11, 2018 (see English abstract).

Sugimoto, Maki et al., "A Game Environment Using Small Robots with Mixed Reality" Transactions of the Information Society of Japan, Information Processing Society of Japan, vol. 48, No. 11, 13 pages including pp. 3490-3499, Nov. 15, 2007 (see English abstract).

Hayashi, Okamoto, Proposal of a Robot Simulation Environment with Augmented Reality. Correspondences on Human Interface, Human Interface Society. National Center for Industrial Property Information and Training, vol. 13, No. 7, 9 pages, Feb. 2012 (see English abstract).

* cited by examiner

FIG.5

<STATE INFORMATION>

| INTERNAL STATE | ITEM | STATE VALUE (1 TO 5) |
|---|---|---|
| EMOTION | ANGER | 1 |
| | FUN | 5 |
| | SURPRISE | 1 |
| | FEAR | 1 |
| | HAPPINESS | 3 |
| PERSONALITY | ACTIVE | 4 |
| | EMOTIONAL | 5 |
| | STRONG-MINDEDNESS | 5 |
| | VITALITY | 5 |
| | AGGRESSIVE | 5 |
| | CURIOSITY | 2 |
| | KINDNESS | 1 |
| ACTION CHARACTERISTICS | TONE OF VOICE | 3 |
| | SPEAKING SPEED | 3 |
| | MOTION SPEED | 3 |

ENTERTAINMENT SYSTEM, ROBOT DEVICE, AND SERVER DEVICE

TECHNICAL FIELD

The present invention relates to an entertainment system, a robot device, and a server device.

BACKGROUND ART

PTL 1 discloses an electronic pet system in which a body of an electronic pet is realized by a pet type robot and a virtual pet device, which displays an image of the electronic pet on a screen, while spirit of the electronic pet is realized by an integrated circuit (IC) card. By mounting the IC card that is the spirit, each of the pet type robot and the virtual pet device functions as the electronic pet. With the IC card mounted in the virtual pet device, the electronic pet is displayed on a monitor of the virtual pet device and takes an action on the basis of gene data stored in the IC card. Further, with the IC card mounted in the pet type robot, the pet type robot also takes an action on the basis of the gene data stored in the IC card.

In the electronic pet system disclosed in PTL 1, the virtual pet device and the pet type robot have the same configuration of internal status model. Even in a case where the IC card is mutually exchanged between the virtual pet device and the pet type robot, controls are made such that the features and actions of the electronic pet remain the same.

CITATION LIST PATENT LITERATURE

[PTL 1] Japanese Patent Application Laid-Open No. H11-126017

SUMMARY

Technical Problem

With the development of technology, the functions of robots have been significantly evolving. In recent years, not only pet type robots but also humanoid robots that can perform various motions such as dance have been on the market. Further, with the improvement of voice processing functions and image processing functions, studies into which robots provided with these functions understand contents of human's utterances and talk with humans or detect changes in human's facial expressions and estimate human's emotions are also being conducted. The inventor pays attention to such evolution of the robot functions and proposes an environment for realizing entertainment using a robot.

An object of the present invention is to provide a new environment in which a human interacts with a robot.

Solution to Problem

In order to solve the above-described issue, an entertainment system according to an aspect of the present invention includes: a robot device capable of acting in an autonomous action mode in a real world; a server device configured to create a virtual world in which a virtual robot associated with the robot device autonomously acts; and a terminal device capable of displaying an image of the virtual world in which the virtual robot acts. The server device provides the image of the virtual world to the terminal device. The server device transmits a request from the virtual robot to the robot device. When the robot device acquires the request from the virtual robot, the robot device acts in a collaboration action mode in which collaboration is made with the virtual robot.

Another aspect of the present invention is a robot device capable of acting in an autonomous action mode. The robot device according to this aspect includes: a request acquisition section configured to acquire a request from a virtual robot associated with the robot device, the virtual robot being in a virtual world; a mode setting section configured to, when the request acquisition section acquires the request from the virtual robot, set a collaboration action mode in which collaboration is made with the virtual robot; an action determination section configured to, when the collaboration action mode is set, determine an action corresponding to the request from the virtual robot; and a control section configured to control a motion of the robot device such that the robot device takes the action determined by the action determination section.

Still another aspect of the present invention is a server device that causes a virtual robot associated with a robot device in a real world to act in a virtual world. The server device according to this aspect includes: a request transmission section configured to transmit a request from the virtual robot to the robot device; a response acquisition section configured to acquire a user response from the robot device; and a virtual robot control section configured to reflect the user response in a motion of the virtual robot.

It is noted that any combinations of the above-described components and the expressions of the present invention that are converted between methods, devices, systems, computer programs, recording media on which computer programs are readably recorded, data structures, and the like are also effective as aspects of the present invention.

BRIEF DESCRIPTION OF DRAWINGS

FIG. 5 is a diagram illustrating an example of state information.

DESCRIPTION OF EMBODIMENT

In an embodiment, an entertainment system in which a user can interact with a robot device in the real world and see how a virtual robot in the virtual world does is provided.

Figure 1:
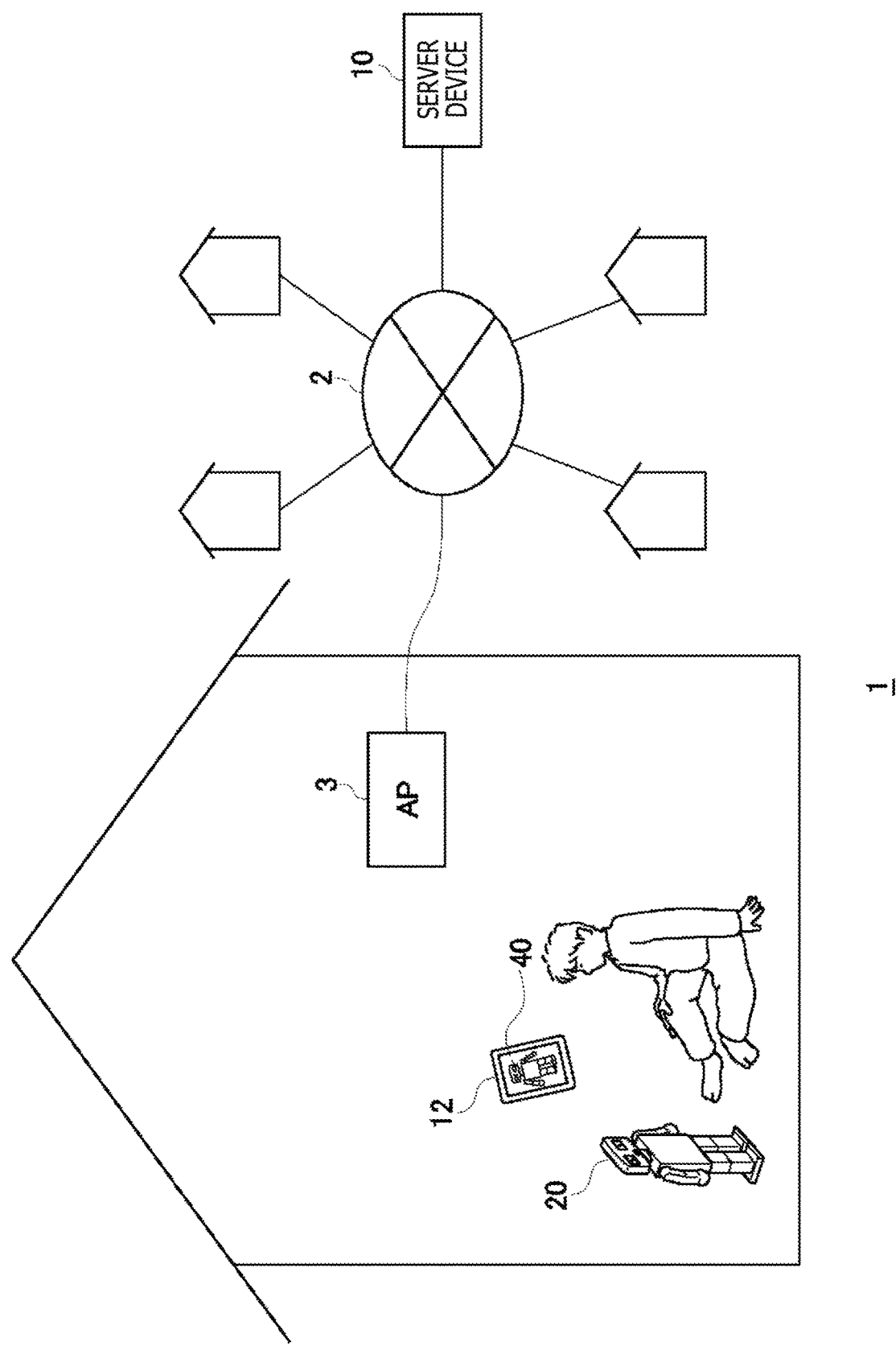
FIG. 1 is a diagram illustrating a schematic configuration of an entertainment system.

FIG. 1 illustrates a schematic configuration of an entertainment system 1 according to the embodiment. The entertainment system 1 includes a robot device 20, a server device 10, and a terminal device 12. The robot device 20 is capable of acting in an autonomous action mode in the real world. The server device 10 causes a virtual robot 40, which is associated with the robot device 20, to act in the virtual world. The terminal device 12 is capable of displaying an image of the virtual world in which the virtual robot 40 acts. The robot device 20 and the terminal device 12 are connected to the server device 10 via an access point (AP) 3 and a network 2 such as the Internet. The server device 10 provides the image of the virtual world to the terminal device 12.

The robot device 20 is owned by the user. The robot device 20 is a humanoid or pet type robot with actuators provided at joint portions such as arms, legs, and a neck, and can take various actions including movement. It is preferable that the robot device 20 can change facial expressions and the like. Further, the robot device 20 has a voice processing function for analyzing contents of the user's utterance and a function for recognizing the user's action from an image of the user captured by a camera and information from a touch sensor or the like.

Figure 2:
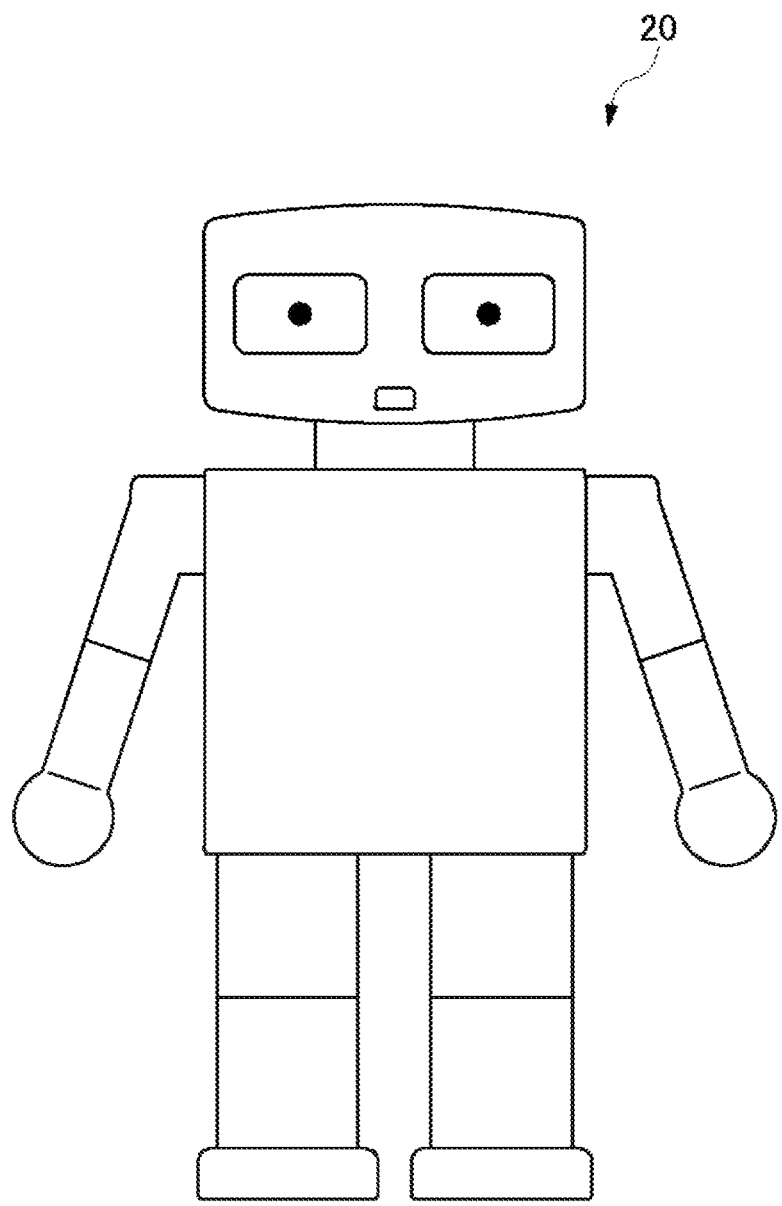
FIG. 2 is a view illustrating an example of appearance of a robot device.

FIG. 2 illustrates an example of the appearance of the robot device 20, which is a humanoid robot. Since the entertainment system 1 according to the embodiment aims to provide an environment in which the user interacts with the robot device 20, the robot device 20 is preferably formed in such a way as to make the user feel that the robot device 20 is a living body. Examples of such a form include humanoids and pet types. However, the shape of the robot device 20 is not particularly limited thereto.

Figure 3:
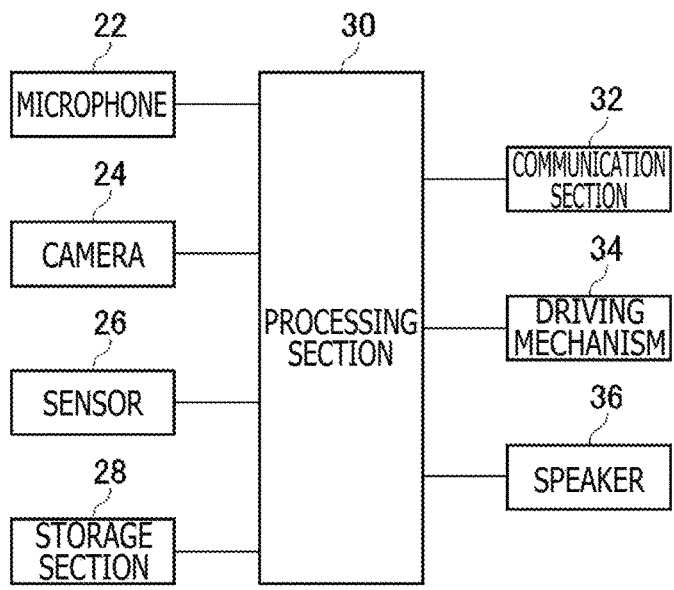
FIG. 3 is a diagram illustrating an input/output system of the robot device.

FIG. 3 illustrates an input/output system of the robot device 20. A processing section 30 is a main processor that processes and outputs various data such as voice data and sensor data, and instructions. The processing section 30 drives a driving mechanism 34 to move the robot device 20 and causes a speaker 36 to output voice. The driving mechanism 34 includes motors, a link mechanism, and rotation angle sensors. The motors are incorporated in the joint portions, which are movable portions of the robot device 20. The link mechanism couples the motors. The rotation angle sensors detect the rotation angles of the motors. When the motors are moved, the arms, legs, neck, and the like of the robot device 20 are moved accordingly. It is noted that the processing section 30 may drive the driving mechanism 34 and cause the speaker 36 to output voice on the basis of motion data generated by the server device 10.

A microphone 22 collects ambient voice and converts the ambient voice into a voice signal. A camera 24 captures an image of the surroundings to acquire a captured image. A sensor 26 includes the touch sensor, a three-axis acceleration sensor, a gyro sensor, a positioning sensor, and the like. The touch sensor detects contact by the user. The three-axis acceleration sensor, the gyro sensor, and the positioning sensor detect the orientation, posture, and the amount of movement, and the like of the robot device itself. A storage section 28 stores data, instructions, and the like that are processed by the processing section 30. A communication section 32 performs wireless communication via an antenna to transmit data output from the processing section 30 to the server device 10, and also performs wireless communication to receive motion data, various types of information, and the like from the server device 10 and outputs the motion data and information to the processing section 30.

The robot device 20 has state information and function information. The state information represents the personality, emotion, and the like of the robot individual. The function information represents functions of the robot individual. The state information and the function information of the robot device 20 are stored in the storage section 28, appropriately updated according to the experience of the robot device 20, and synchronized with the server device 10. The processing section 30 causes the robot device 20 to autonomously act on the basis of the state information and/or the function information, and also updates the state information and/or the function information according to an action taken by the robot device 20 and/or an external input into the robot device 20 in the real world.

The user participates in the entertainment system 1 by registering the robot device 20, which is owned by the user, in the server device 10. After the server device 10 registers the robot device 20 in association with the user, the server device 10 creates the virtual robot 40 corresponding to the robot device 20 and causes the virtual robot 40 to act in the virtual world. Through the terminal device 12 such as a smartphone or a tablet, the user can see how the virtual world in which the virtual robot acts looks like.

The server device 10 creates the virtual robot 40 as a virtual object model having the same appearance as the robot device 20 in the real world. This allows the user to see, through the terminal device 12, how the virtual robot 40 having the same appearance as the robot device 20 acts in the virtual world formed by three-dimensional CG (computer graphics). It is noted that the server device 10 preferably matches physical functions of the virtual robot 40 with physical functions of the robot device 20.

For example, in a case where the robot device 20 has such a mechanical constraint that the robot device 20 can only rotate leg portions back and forth up to 90 degrees with respect to a waist portion from an upright state, the server device 10 preferably imposes a similar constraint on the virtual robot 40. That is, in a case where the upper limit of the rotation angles of the leg portions with respect to the waist portion of the robot device 20 is 90 degrees, the server device 10 sets the upper limit of the rotation angles of the leg portions with respect to the waist portion of the virtual robot 40 to 90 degrees, which is the same as the robot device 20. The server device 10 acquires specification information such as the range of motion of each joint of the driving mechanism 34 of the robot device 20, the maximum walking speed of the robot device 20, and the like, and sets the physical functions of the virtual robot 40. The specification information of the robot device 20 may be acquired from the manufacturer of the robot device 20, for example. Matching the physical functions of the virtual robot 40 with the physical functions of the robot device 20 allows the user to truly feel that the robot device 20 owned by the user is acting in the virtual world when the user sees the virtual robot 40 on the terminal device 12.

In the entertainment system 1, the function information of each of the robot device 20 and the virtual robot 40 is managed synchronously. Here, the function information refers to information regarding functions that can or cannot be executed. By installing an application program (hereinafter also referred to as "app") in the robot device 20, the robot device 20 acquires the function of the app. For example, the robot device 20 can dance with an application program ("dance app") for dancing installed therein. At this time, the robot device 20 manages the dance function as a function value "on," which indicates that the dance function is executable. On the other hand, in a case where the dance app is not installed, the robot device 20 cannot dance and manages the dance function as a function value "off," which indicates that the dance function is not executable.

When the function value of the dance function is updated in the robot device 20, the update information is transmitted to the server device 10 and the server device 10 performs a synchronization process of updating the function value of the dance function. The server device 10 controls the dance function of the virtual robot 40 according to the function value of the dance function. That is, in a case where the dance function value is "on," the server device 10 can enable the virtual robot 40 to dance in the virtual world. In a case where the dance function value is "off," the server device 10 disables the virtual robot 40 to dance in the virtual world. In this manner, the function value is effective in both the real world and the virtual world. Therefore, the function that the robot device 20 can execute in the real world and the function that the virtual robot 40 can execute in the virtual world are made equal to each other. Accordingly, when the dance app is uninstalled from the robot device 20, the dance function value is set to "off," disabling both the robot device 20 and the virtual robot 40 to dance.

In the virtual world, the virtual robot 40 can learn to dance by being taught a dance by another virtual robot that can dance. When the virtual robot 40 learns to dance, the server device 10 distributes the dance app to the robot device 20. It is noted that an application server other than the server device 10 may distribute the dance app to the robot device 20. With the distributed dance app installed, the processing section 30 of the robot device 20 sets the dance function value to "on" and transmits the update information of the dance function value to the server device 10. Accordingly, the server device 10 sets the dance function value of the virtual robot 40 to "on."

It is noted that the dance app is an example of functions. When the virtual robot 40 learns rock-paper-scissors in the virtual world, an application program for rock-paper-scissors ("rock-paper-scissors app") is installed in the robot device 20 and enables the robot device 20 to play rock-paper-scissors with the user in the real world. Conversely, when the robot device 20 installs the rock-paper-scissors app therein, the virtual robot 40 can play rock-paper-scissors with another virtual robot in the virtual world.

It is noted that the function value takes not only a binary value of "on" or "off," but also may be represented by a value, such as "low," "middle," or "high," that represents the level of achievement or may be represented by a numerical value that is set in a predetermined range to represent the proficiency level or the amount of experience of the function in stages. The type of the function value may be appropriately set according to the type of an application program.

In this manner, the functions of the robot device 20 and the virtual robot 40 are managed as the function information in synchronization between the robot device 20 and the server device 10. Since the function information is managed synchronously in the robot device 20 and the server device 10, the virtual robot 40 can do what the robot device 20 can do, and the robot device 20 can do what the virtual robot 40 can do.

The server device 10 according to the embodiment provides the virtual world in which virtual robots of a plurality of users participate and individual virtual robots autonomously act. The server device 10 causes each virtual robot to autonomously act in the virtual world according to the state information and function information of the corresponding virtual robot. A town formed by three-dimensional CG is created in the virtual world, and virtual robots of various users autonomously act and live therein.

Figure 4:
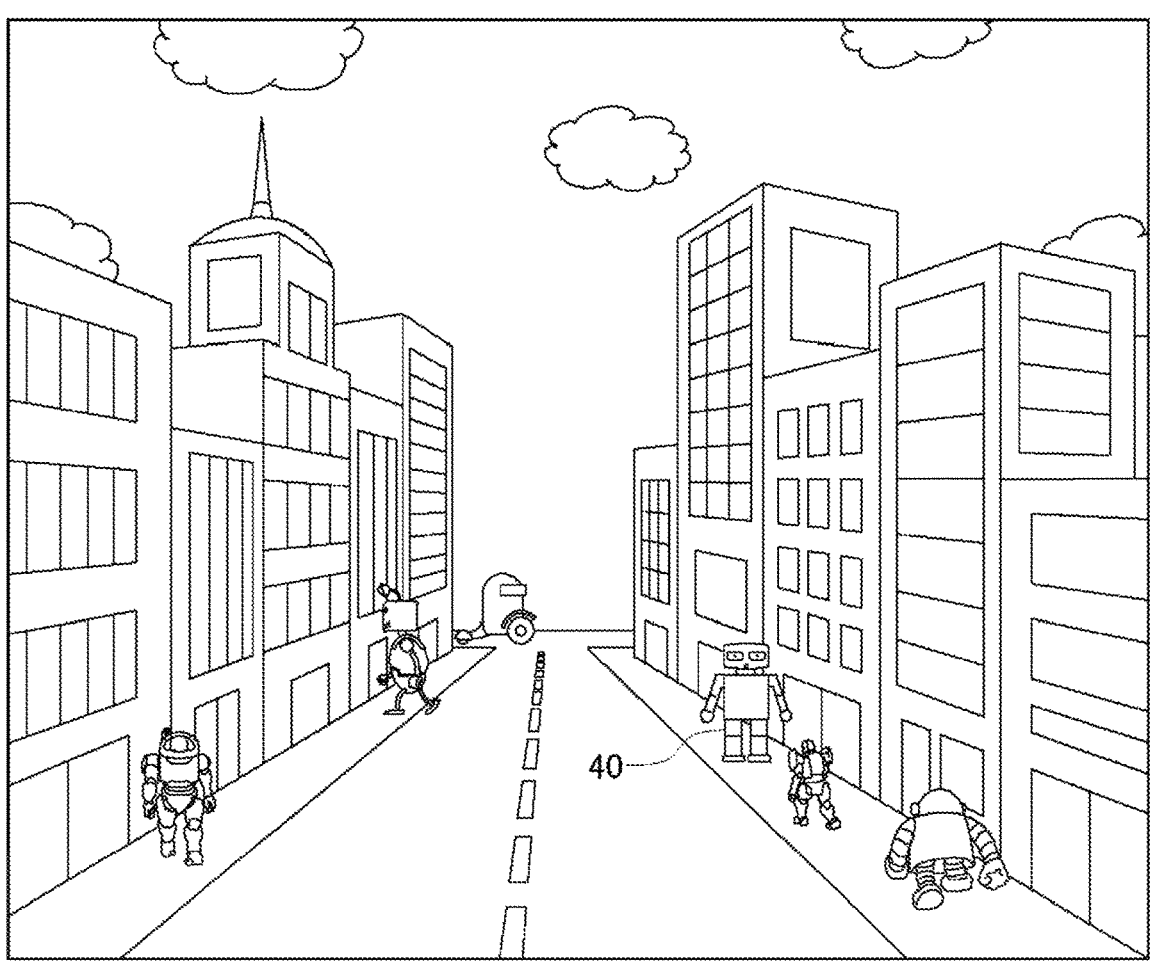
FIG. 4 is a view illustrating an example of a virtual world.

FIG. 4 illustrates an example of the virtual world. The virtual robot 40 is a CG character associated with the robot device 20 owned by the user and has the appearance similar to that of the robot device 20. The server device 10 creates the virtual world in which a plurality of virtual robots can act and communicate with each other in a meeting with each other. The virtual robot 40 acquires new functions by having various experiences in the virtual world and updates state information (state values) that represents the personality and emotion.

FIG. 5 illustrates an example of the state information. Hereinafter, the robot device 20 and the virtual robot 40 may be occasionally collectively referred to as "robot." The state information according to the embodiment includes information regarding robot internal states of "emotion," "personality," and "action characteristics." "Emotion" includes parameters of "anger," "sadness," "surprise," "fear," and "happiness." "Personality" includes parameters of "active," "emotional," "strong-mindedness," "vitality," "aggressive," "curiosity," and "kindness." "Action characteristics" include parameters of "tone of voice," "speaking speed," and "motion speed." A state value, which takes an integer value in the range of 1 to 5, is set to each parameter. The state value 1 indicates that the degree of the state is the lowest, while the state value 5 indicates that the degree of the state is the highest. It is noted that the categories of the internal states and the parameters of each internal state are not limited to those described.

The parameters of "emotion" are indexes that represent emotions of the robot. For example, the state value 1 of "anger" indicates a state in which there is no anger at all, while the state value 5 indicates a state in which anger is at maximum. When the robot device 20 is spoken to harshly or treated meanly by the user, the state value of "anger" is updated to a higher value. Further, when the virtual robot 40 in the virtual world is spoken to harshly or treated meanly by another virtual robot, the state value of "anger" is updated to a higher value. It is noted that at this time, the state value of "happiness" may be updated to a lower value (or sadness may be updated to increase). The state values of the parameters of "emotion" are managed such that the values are increased or decreased individually or in combination according to an external input in the real world and an event that occurs in the virtual world.

The parameters of "personality" are indexes that represent the personality of the robot. The state values of the parameters of "personality" are also managed such that the values are increased or decreased individually or in combination according to an external input in the real world and an event that occurs in the virtual world.

Some of the parameters will be described. For example, the "active" parameter represents activeness toward a human or another virtual robot. The state value 1 indicates a passive state in which there is no willingness to approach a human or another virtual robot, while the state value 5 indicates an active state in which there is a willingness to approach a human or another virtual robot. In a case where the virtual robot 40 with its "active" parameter set as the state value 1 communicates with another virtual robot with its "active" parameter set as the state value 5, the state value of the "active" parameter of the virtual robot 40 is updated to a higher value. With the state value of the "active" parameter becoming higher, the robot device 20 takes such an autonomous action that the robot device 20 approaches the user, while the virtual robot 40 is more likely to take such an action that the virtual robot 40 speaks to another virtual robot.

The "vitality" parameter represents the level of vitality to explore a new place. The state value 1 indicates a state in which a sphere of activity is narrow, while the state value 5 indicates a state in which a sphere of activity is wide and there is a willingness to explore a new place. For example, when the user takes the robot device 20 out of the house, the state value of the "vitality" parameter may be updated to a higher value. Since the state value is synchronized in the server device 10, the server device 10 causes the virtual robot 40 to act in a wide sphere.

The parameters of "action characteristics" are indexes that represent the action characteristics of the robot. The "tone of voice" parameter represents whether the choice of words is rough or polite. The state value 1 indicates a state in which the choice of words is the roughest, while the state value 5 indicates a state in which the choice of words is the politest. The state value 1 of the "speaking speed" parameter indicates a state in which the speaking speed is the slowest, while the state value 5 indicates a state in which the speaking speed is the fastest. The state value 1 of the "motion speed" parameter indicates a state in which the motions of hands and feet are the slowest, while the state value 5 indicates a state in which the motions of hands and feet are the fastest (a state in which the motions are quick). The state value of each parameter of the "action characteristics" is managed so as to be increased or decreased according to an external input in the real world and an event that occurs in the virtual world.

Figure 6:
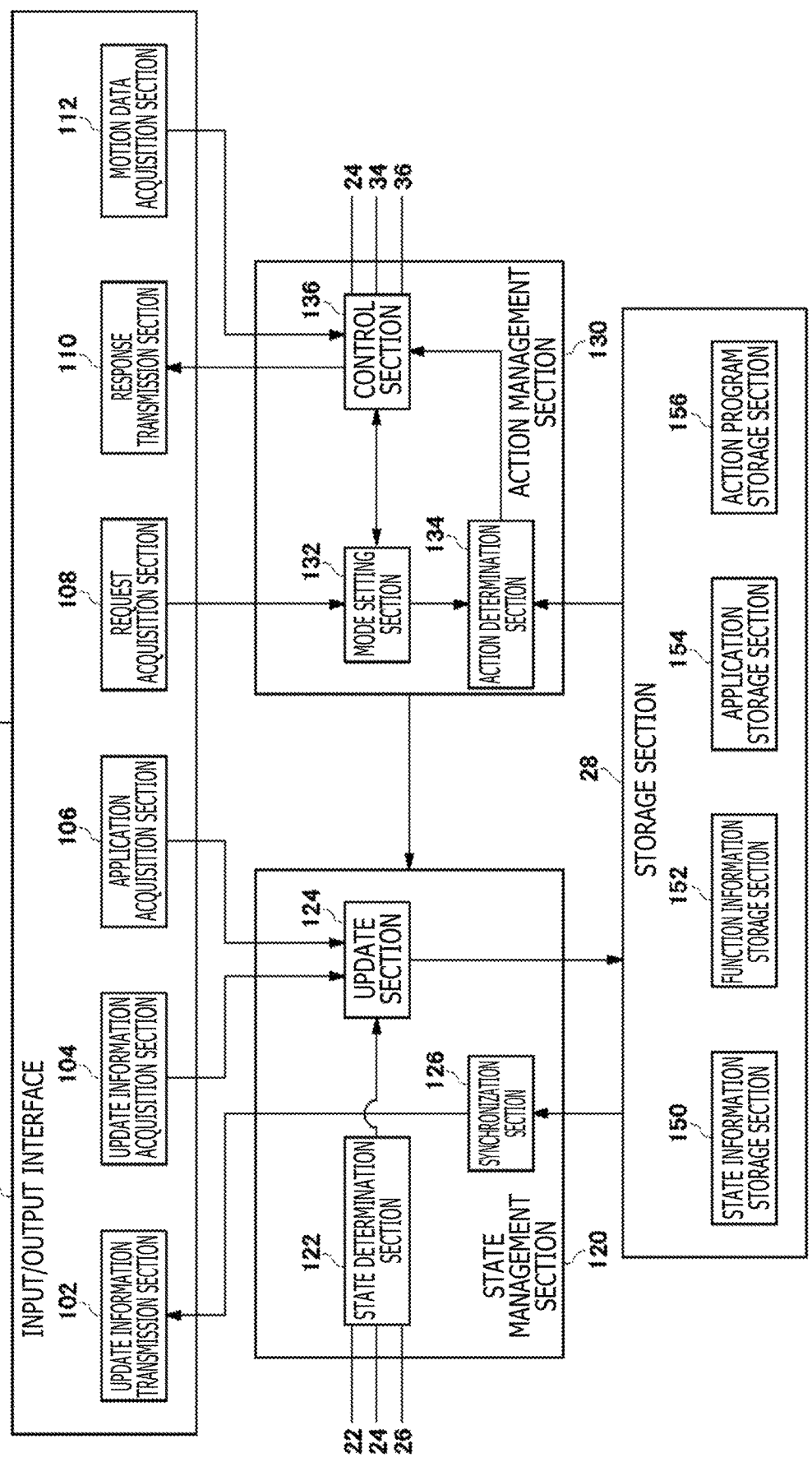
FIG. 6 is a diagram illustrating a configuration for controlling a motion of the robot device.

FIG. 6 illustrates a configuration for controlling the motion of the robot device 20. The robot device 20 includes, as a motion control configuration, an input/output interface 100, a state management section 120, an action management section 130, and the storage section 28. The functions of the input/output interface 100, the state management section 120, and the action management section 130 are realized by the processing section 30.

The input/output interface 100 is an interface that transmits and receives various data and messages such as requests and responses to and from the server device 10, and includes an update information transmission section 102, an update information acquisition section 104, an application acquisition section 106, a request acquisition section 108, a response transmission section 110, and a motion data acquisition section 112. The state management section 120 manages the states and functions of the robot device 20 and includes a state determination section 122, an update section 124, and a synchronization section 126. The action management section 130 manages the action of the robot device 20 and includes a mode setting section 132, an action determination section 134, and a control section 136.

The storage section 28 includes a state information storage section 150, a function information storage section 152, an application storage section 154, and an action program storage section 156. The state information storage section 150 stores the state information of the robot device 20. The function information storage section 152 stores the function information of the robot device 20. The application storage section 154 stores an application program for realizing a function of the robot device 20. In principle, the function information storage section 152 manages the function information so as to turn on the function value of an app in a case where the app is installed in the robot device 20 and turn off the function value of an app in a case where the app is not installed. However, in a case where the app is installed but cannot be executed, the function information storage section 152 stores the function value of the app as off. The action program storage section 156 stores a program for causing the robot device 20 to perform an autonomous action.

Each of elements described as functional blocks that perform various processes in FIG. 6 can be configured by a circuit block, a memory, or other LSI in terms of hardware, and is realized by a program or the like loaded into a memory in terms of software. Therefore, it will be understood by those skilled in the art that these functional blocks can be realized in various forms with hardware alone, software alone, or a combination thereof, and the functional blocks are not limited to any one of these forms.

Figure 7:
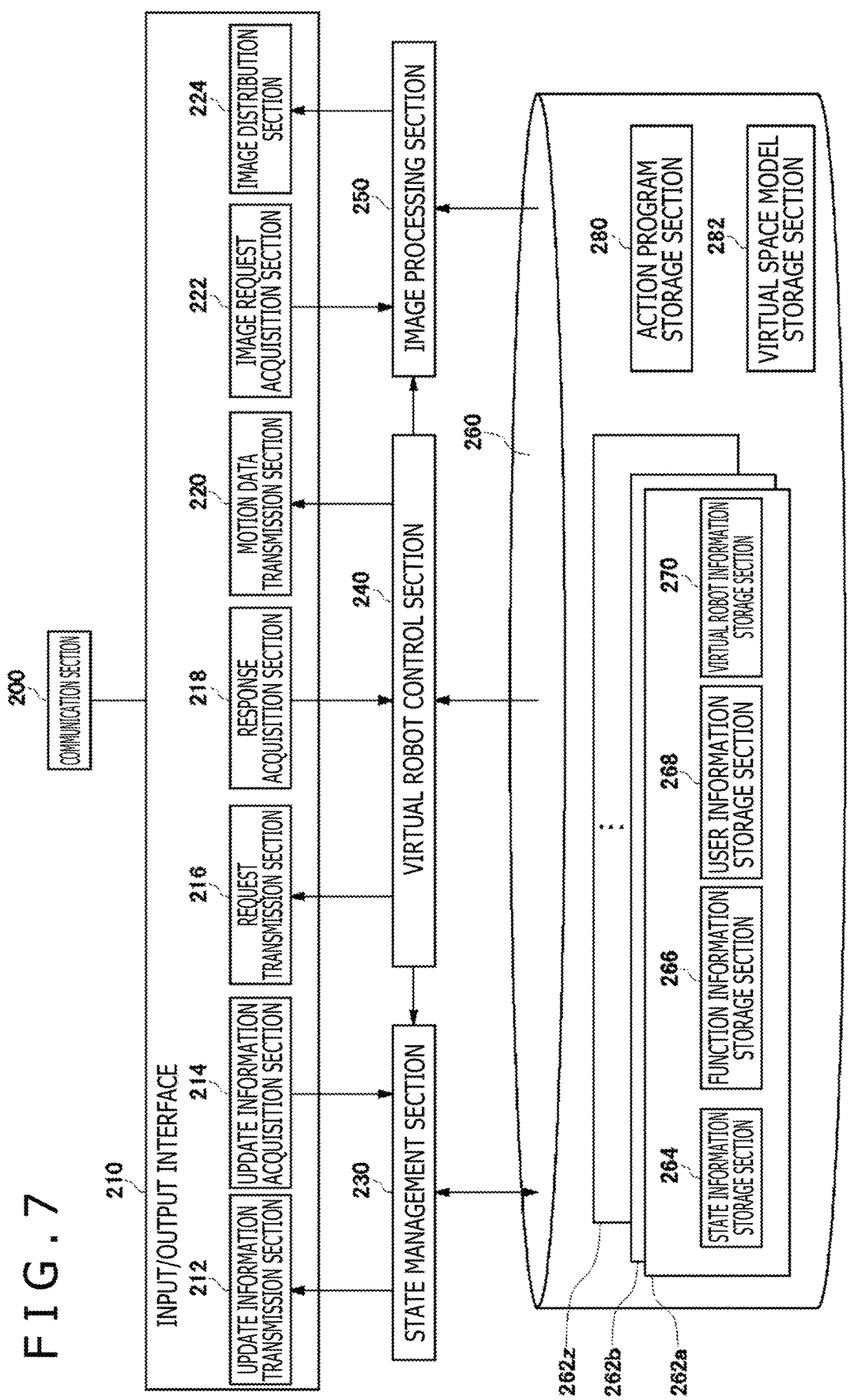
FIG. 7 is a diagram illustrating a configuration of a server device.

FIG. 7 illustrates a configuration of the server device 10. The server device 10 includes a communication section 200, an input/output interface 210, a state management section 230, a virtual robot control section 240, an image processing section 250, and a storage device 260. The input/output interface 210 is an interface that transmits and receives various data and messages such as requests and responses to and from the robot device 20 and the terminal device 12, and includes an update information transmission section 212, an update information acquisition section 214, a request transmission section 216, a response acquisition section 218, a motion data transmission section 220, an image request acquisition section 222, and an image distribution section 224.

The storage device 260 includes individual information storage sections 262a to 262z, an action program storage section 280, and a virtual space model storage section 282. The individual information storage sections 262a to 262z (hereinafter referred to as "individual information storage section 262" in a case where no distinction is made therebetween) store, for each corresponding user, information regarding the user and robot participating in the entertainment system 1. The individual information storage section 262 related to each corresponding user includes a state information storage section 264, a function information storage section 266, a user information storage section 268, and a virtual robot information storage section 270. The state information storage section 264 stores the state information of the virtual robot 40. The function information storage section 266 stores the function information of the virtual robot 40. The user information storage section 268 stores information regarding the user, such as, for example, address information of each of the robot device 20 and the terminal device 12 owned by the user, user identification information (user ID), and personal information such as the name and address of the user. The virtual robot information storage section 270 stores model data that are necessary to cause the virtual robot 40 to act and to be displayed in the virtual space. The model data include the shape and appearance data of a virtual object created in association with the robot device 20, the positions and range of motion of the joints such as the arms, legs, and neck, and the like.

As described above, the user participates in the entertainment system 1 by registering the robot device 20, which is owned by the user, in the server device 10. The server device 10 stores information regarding the user in the user information storage section 268 and stores the created model data of the virtual robot 40 in the virtual robot information storage section 270.

The action program storage section 280 stores a program for causing the virtual robot 40 to act in the virtual space. The virtual space model storage section 282 stores virtual space model data for creating a three-dimensional virtual space. The model data include static object data in which position information and the like are basically not updated. For example, model data that represent a virtual space of a town include building objects, road objects, traffic light objects, store objects, and the like whose relative positional relationships are defined. It is noted that dynamic objects other than the virtual robot associated with the robot device, such as, for example, a merchant robot that sells goods, an attendant robot that guides the virtual robot, and a vehicle object that serves as a moving means of the virtual robot, may be present in the virtual space.

The three-dimensional virtual space may be formed on the basis of a real world map. The virtual robot may be initially positioned at the address in the virtual world that corresponds to the user's address. For example, in a case where the user's address is in Japan, the user's virtual robot is initially positioned at a location corresponding to Japan in the virtual world. Further, in a case where the user's address is in the United States, the user's virtual robot is initially positioned at a location corresponding to the United States in the virtual world. As described above, the "vitality" parameter represents the level of vitality to explore a new place. Therefore, a virtual robot with a high state value of the "vitality" parameter tends to move to another country on a plane. By contrast, a virtual robot with a low state value tends to act only around the location initially positioned.

Each of elements described as functional blocks that perform various processes in FIG. 7 can be configured by a circuit block, a memory, or other large-scale integration (LSI) in terms of hardware, and is realized by a program or the like loaded into a memory in terms of software. Therefore, it will be understood by those skilled in the art that these functional blocks can be realized in various forms with hardware alone, software alone, or a combination thereof, and the functional blocks are not limited to any one of these forms.

<Management of State Information>

In the entertainment system 1, the state information of the robot is managed synchronously in the robot device 20 and the server device 10. Hereinafter, a method for managing the robot state information will be described.

When the user registers the robot device 20 in the server device 10, the state management section 230 of the server device 10 sets initial values of the state information, which are commonly used by the robot device 20 and the virtual robot 40. The state management section 230 may define the state value of each item illustrated in FIG. 5 as a randomly determined initial value. Alternatively, the initial values of the state information may be specified by the user. In the embodiment, the state information (state value) is updated according to an action taken by the robot device 20 and/or an external input into the robot device 20 in the real world. Further, the state information (state value) is updated according to an action taken by the virtual robot 40 and/or an external input into the virtual robot 40 in the virtual world.

The virtual robot control section 240 causes virtual robots of a plurality of users to autonomously act in the virtual space on the basis of the action program stored in the action program storage section 280. At this time, the action of each virtual robot reflects the state information (state values) stored in the state information storage section 264 and the function information (function values) stored in the function information storage section 266.

For example, when the virtual robot 40 with the state value of the "active" parameter set as 1 encounters another virtual robot in the virtual space, the virtual robot 40 acts so as to pass without trying to communicate with the other virtual robot. At this time, in a case where the state value of the "active" parameter of the other virtual robot is also 1, no communication occurs because both act so as to pass each other.

However, in a case where the state value of the "active" parameter of the other virtual robot is 5, the other virtual robot acts so as to actively approach the virtual robot 40 and the virtual robot 40 consequently communicates with the other virtual robot.

In order to determine whether or not the virtual robot 40 acts so as to communicate with another virtual robot, the action program stored in the action program storage section 280 defines in advance which state information is to be referred to. While one of the state information to be referred to is the state value of the above-described "active" parameter, the state value of a "fun" parameter may be included or the state value of the "curiosity" parameter may be included, for example. In this case, the virtual robot control section 240 determines whether or not the virtual robot 40 acts so as to communicate with another virtual robot in consideration of the respective state values of the "active" parameter, the "fun" parameter, and the "curiosity" parameter.

In the virtual world, communication of the virtual robot 40 with another virtual robot is defined as one event. Further, the virtual robot 40 can be taught or teach a dance or can be taught or teach rock-paper-scissors by communicating with the virtual robot, and each of these cases is defined as an event. An event that occurs during an action of the virtual robot 40 is a trigger to update the state information and/or the function information of the virtual robot 40. When the virtual robot control section 240 detects the occurrence of an event, the virtual robot control section 240 sends a notification of the contents of the detected event to the state management section 230.

The state management section 230 updates information stored in the state information storage section 264 and/or the function information storage section 266 on the basis of event information notified by the virtual robot control section 240. For example, when the state management section 230 is notified of event information indicating that the virtual robot 40 has communicated with another virtual robot, the state management section 230 updates the state value of the "active" parameter of the virtual robot 40 to a higher value by one. This means that the virtual robot 40 has improved its activeness through interaction with another virtual robot.

In a case where the state value of the "aggressive" parameter of another virtual robot with which the virtual robot 40 communicates is high and the virtual robot 40 is treated meanly, the virtual robot control section 240 sends a notification of event information indicating that the virtual robot 40 has been meanly treated to the state management section 230. On the basis of the event information, the state management section 230 updates each of the state values of the "anger" parameter and the "fear" parameter of the virtual robot 40 to a higher value by one, while updating the state value of the "active" parameter to a lower value by two. This means that since the virtual robot 40 has been treated meanly, the virtual robot 40 increases the degree of anger in reaction to such a treatment and also generates a feeling of fear in terms of emotion, while decreasing the activeness to try to interact with other virtual robots in terms of personality.

Further, in a case where the state value of the "tone of voice" parameter of another virtual robot with which the virtual robot 40 communicates is low and the choice of words is rough, the virtual robot control section 240 sends a notification of event information indicating that the virtual robot 40 has been spoken to in a rough tone of voice to the state management section 230. The state management section 230 updates the state value of the "tone of voice" parameter of the virtual robot 40 to a lower value by one on the basis of the event information. This means that since the virtual robot 40 has interacted with the other virtual robot, the bad choice of words is slightly rubbed off on the virtual robot 40.

Several events have been described as examples above. The action program storage section 280 stores state change information in which changes in the state information to be reflected are defined for various events. The state management section 230 refers to the state change information according to the notified event information and sequentially updates the state information of the virtual robot 40 stored in the state information storage section 264. After the state management section 230 updates the state information in the state information storage section 264, the state management section 230 causes the update information transmission section 212 to transmit the updated latest state information to the robot device 20.

Next, a method for updating the state information of the robot device 20 will be described with reference to FIG. 6.

The robot device 20 has a standby mode and an action mode as motion modes. The mode setting section 132 sets the motion mode of the robot device 20.

The standby mode is a waiting state in which communication with the outside is possible, and is a mode in which processing functions such as the state management section 120 and the action management section 130 are turned off. In the standby mode, a main power-on operation by the user and a main power-on instruction transmitted from the server device 10 are monitored. When the main power is turned on, the mode setting section 132 switches the motion mode from the standby mode to the action mode.

The action mode includes an autonomous action mode in which the robot device 20 autonomously acts and a collaboration action mode in which the robot device 20 collaborates with the virtual robot 40.

When the main power is turned on by the user, the mode setting section 132 sets the autonomous action mode and sends a notification of the setting to the action determination section 134 and the control section 136. In the autonomous action mode, the action determination section 134 determines an action to be taken by the robot device 20 on the basis of the action program stored in the action program storage section 156. The control section 136 controls the driving mechanism 34 and the speaker 36 according to the action determined by the action determination section 134. The action determination section 134 refers to the state information stored in the state information storage section 150 in determining an action to be taken by the robot device 20.

For example, in a case where the state value of the "active" parameter is 1, the robot device 20 acts so as to play alone without trying to communicate with the user. On the other hand, in a case where the state value of the "active" parameter is 5, the robot device 20 acts so as to actively approach and communicate with the user. At this time, the action determination section 134 determines such actions as approaching and speaking to the user or playing rock-paper-scissors, and the control section 136 controls the driving mechanism 34 and the speaker 36 to perform the determined actions.

In order to determine whether or not the robot device 20 acts so as to communicate with the user, the action program stored in the action program storage section 156 defines in advance which state information is to be referred to. While one of the state information to be referred to is the state value of the above-described "active" parameter, the state value of the "fun" parameter may be included or the state value of the "curiosity" parameter may be included, for example. In this case, the action determination section 134 determines whether or not the robot device 20 acts so as to communicate with the user in consideration of the respective state values of the "active" parameter, the "fun" parameter, and the "curiosity" parameter. The action determination section 134 sends a notification of the determined action of the robot device 20 to the state management section 120.

The state determination section 122 determines the update of the state information stored in the state information storage section 150 on the basis of the notified action of the robot device 20. For example, when the state determination section 122 is notified that the robot device 20 acts so as to speak to the user, the state determination section 122 determines to increase the state value of the "active" parameter of the robot device 20 by one. This means that the robot device 20 has improved its activeness through interaction with the user. The update section 124 is notified of the state update information determined by the state determination section 122, and updates the state information stored in the state information storage section 150.

Further, the state determination section 122 determines the update of the state information stored in the state information storage section 150 according to an external input into the robot device 20 in the real world. The state determination section 122 has functions of acquiring input voice data from the microphone 22, captured image data from the camera 24, and sensor data from the sensor 26, and processing external input data.

The state determination section 122 has a voice processing function and estimates the user's emotion from voice data input into the microphone 22. Specifically, the state determination section 122 identifies the contents of the user's utterance using a voice recognition function and estimates whether the user has a positive emotion or a negative emotion to the robot device 20. When the state determination section 122 estimates that the user has a positive emotion, the state determination section 122 determines to increase the state value of the "happiness" parameter of the robot device 20 by one and sends a notification of the determination to the update section 124. On the other hand, when the state determination section 122 estimates that the user has a negative emotion, the state determination section 122 determines to decrease the state value of the "happiness" parameter by one and sends a notification of the determination to the update section 124.

Further, the state determination section 122 may have an image processing function and estimate the user's emotion from the user's facial expression and attitude included in captured image data of the camera 24. The state determination section 122 determines the update of the state information by estimating whether the user has a positive emotion or a negative emotion to the robot device 20.

The state determination section 122 may determine the update of the state information by detecting the user's action against the robot device 20 from the sensor data of the touch sensor, which is the one included in the sensor 26. For example, when the state determination section 122 detects the motion of stroking the head of the robot device 20 from the sensor data of the touch sensor provided on the head of the robot device 20, the state determination section 122 determines to increase the state value of the "happiness" parameter by one and sends a notification of the determination to the update section 124. On the other hand, when the state determination section 122 detects the motion of hitting the robot device 20 on the head from the sensor data of the touch sensor provided on the head of the robot device 20, the state determination section 122 determines to decrease the state value of the "happiness" parameter by one and increase the state value of the "anger" parameter by one, and sends a notification of the determination to the update section 124.

The update section 124 updates the state information stored in the state information storage section 150 according to the state update information notified by the state determination section 122. In this manner, the state information stored in the state information storage section 150 is dynamically updated. For example, when the user continues to take a negative attitude, the state value of the "anger" parameter of the robot device 20 is gradually updated to a higher value. Therefore, the action determination section 134 determines that the robot device 20 takes an action indicating that the robot device 20 is angry at the user. This makes the user be aware that the user's attitude makes the robot device 20 angry, and the user tries to reduce the anger of the robot device 20 by immediately apologizing to the robot device 20, for example. In this manner, since the state information is immediately updated and reflected in the action of the robot device 20, the user is able to be aware of the influence of the user's action on the robot device 20.

After the update section 124 updates the state information in the state information storage section 150, the synchronization section 126 causes the update information transmission section 102 to transmit the updated latest state information to the server device 10. In the server device 10, when the update information acquisition section 214 acquires the update information of the state value from the robot device 20, the state management section 230 updates the state information stored in the state information storage section 264. Accordingly, the state information is synchronized between the state information storage section 150 in the robot device 20 and the state information storage section 264 in the server device 10.

It is noted that as described above, in the server device 10, the update information transmission section 212 transmits the latest state information of the virtual robot 40 updated in the virtual world to the robot device 20. In the robot device 20, when the update information acquisition section 104 acquires the update information of the state value from the server device 10, the update section 124 updates the state information stored in the state information storage section 150. Accordingly, the state information is synchronized between the state information storage section 264 in the server device 10 and the state information storage section 150 in the robot device 20.

As described above, the state information of each of the robot device 20 and the virtual robot 40 is managed synchronously in the robot device 20 and the server device 10 through the collaboration between the state management section 120 in the robot device 20 and the state management section 230 in the server device 10. In the robot device 20 in the autonomous action mode, the action determination section 134 determines the action of the robot device 20 according to the state information. Further, in the server device 10, the virtual robot control section 240 causes the virtual robot 40 to act according to the state information. Accordingly, the robot device 20 and the virtual robot 40 autonomously act in their respective worlds under the same emotion, personality, and action characteristics.

<Management of Function Information>

The function information of the robot is managed synchronously in the robot device 20 and the server device 10. Hereinafter, a method for managing the robot function information will be described.

In the robot device 20, the application acquisition section 106 acquires an application program (app) that is used in the entertainment system 1. The application acquisition section 106 may, for example, acquire an app from a universal serial bus (USB) memory or the like storing the app or may acquire an app from the server device 10 or the application server via the network 2. The update section 124 causes the application storage section 154 to store the acquired app while setting the function value of the app function that is made executable by the app in the function information storage section 152 to "on."

When the update section 124 updates the function information in the function information storage section 152, the synchronization section 126 causes the update information transmission section 102 to transmit the updated latest function information to the server device 10. In the server device 10, when the update information acquisition section 214 acquires the update information of the function value from the robot device 20, the state management section 230 updates the function information stored in the function information storage section 266. Accordingly, the function information is synchronized between the function information storage section 152 in the robot device 20 and the function information storage section 266 in the server device 10.

It is noted that the virtual robot 40 can acquire a new function by being taught a dance or rock-paper-scissors by another virtual robot in the virtual world. When the virtual robot 40 acquires the new function, the state management section 230 transmits an application program corresponding to the acquired new function from the update information transmission section 212 to the robot device 20. It is noted that the state management section 230 may cause another application server to transmit the application program to the robot device 20.

Accordingly, in the robot device 20, the application acquisition section 106 acquires the app and the update section 124 installs the app in the application storage section 154 and sets the function value of the app function to "on." At this time, the synchronization section 126 causes the update information transmission section 102 to transmit the updated function information to the server device 10. In the server device 10, when the update information acquisition section 214 acquires the update information of the function value, the state management section 230 updates the function information in the function information storage section 266. In this manner, in a case where the virtual robot 40 acquires a new function in the virtual world, the virtual robot 40 cannot execute the function immediately. The virtual robot 40 can execute the new function on condition that the corresponding app has been installed in the robot device 20. This makes it possible to synchronously manage the function information of each of the robot device 20 and the virtual robot 40.

It is noted that when the robot device 20 acquires a new function in the real world, the function is also reflected in the virtual robot 40. When the application acquisition section 106 acquires an app through interaction between the robot device 20 and the user, the update section 124 installs the app in the application storage section 154 and sets the function value of the app function to "on." At this time, the synchronization section 126 causes the update information transmission section 102 to transmit the updated function information to the server device 10. In the server device 10, when the update information acquisition section 214 acquires the update information of the function value, the state management section 230 updates the function information in the function information storage section 266. In this manner, even in a case where the robot device 20 acquires a new function before the virtual robot 40, the function information of each of the robot device 20 and the virtual robot 40 is synchronously managed.

The above description is about the synchronization processes of the state information and the function information when the robot device 20 acts in the autonomous action mode in the real world and the virtual robot 40 autonomously acts in the virtual world.

The robot device 20 and the virtual robot 40 act independently in the respective worlds. While the robot device 20 acts only when the main power is turned on, the virtual robot 40 is controlled so as to always act in the virtual world. There may be day-and-night time settings in the virtual world. In this case, the virtual robot 40 may sleep at night. It is noted that whether or not the virtual robot 40 sleeps at night is controlled on the basis of the state information. The server device 10 according to the embodiment provides the image of the virtual world to the terminal device 12, and the user can always see how the virtual robot 40 acts in the virtual world through the terminal device 12.

Figure 8:
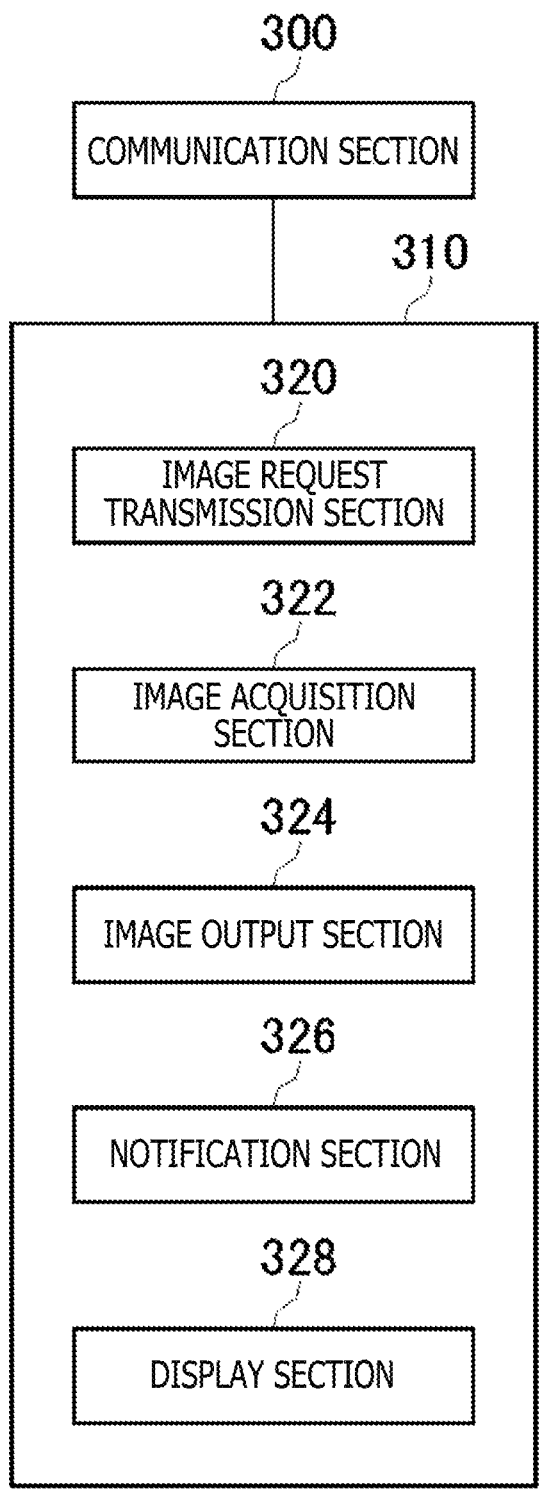
FIG. 8 is a diagram illustrating a configuration of a terminal device.

FIG. 8 illustrates a configuration of the terminal device 12. The terminal device 12 includes a communication section 300 and a processing section 310. The processing section 310 includes an image request transmission section 320, an image acquisition section 322, an image output section 324, a notification section 326, and a display section 328. The display section 328 is a display device such as a liquid crystal panel or an organic display. A touch panel is provided on the surface of the display section 328 and allows the user to perform an input. The terminal device 12 is an information processing device, such as a smartphone or a tablet, with a communication function, and functions of the image request transmission section 320, the image acquisition section 322, the image output section 324, the notification section 326, and the like may be realized by installing a viewer application.

When the user inputs a distribution request for an image to the terminal device 12, the image request transmission section 320 transmits the distribution request for the image of the virtual world to the server device 10. The distribution request includes the user ID. In the server device 10, the image request acquisition section 222 acquires the distribution request, and the image processing section 250 generates the image of the virtual world in which the virtual robot 40 associated with the user ID acts.

The virtual robot control section 240 creates a virtual space on the basis of a virtual space model stored in the virtual space model storage section 282 and causes a plurality of virtual robots to act in the virtual space. The image processing section 250 renders the virtual space in which the virtual robot 40 exists, generates an image to be provided to the user, and causes the image distribution section 224 to distribute the image to the terminal device 12. The user can request an image from a desired viewpoint. For example, the user can request, through the image request transmission section 320, an image in the eye gaze direction of the virtual robot 40 or an image of the virtual robot 40 seen from a higher perspective. When the image request acquisition section 222 acquires a viewpoint change request, the image processing section 250 generates an image from the requested viewpoint and the image distribution section 224 distributes the generated image.

In the terminal device 12, the image acquisition section 322 acquires the image distributed from the image distribution section 224, and the image output section 324 causes the display section 328 to display the image. This allows the user to check how the virtual robot 40 acts in the virtual world. In the entertainment system 1, when the virtual robot 40 gains various experiences, the internal states of the virtual robot 40 and the robot device 20, which include emotion, personality, and action characteristics, change without the user's knowledge. In some cases, therefore, the robot device 20 may be friendly before the user goes to work, but may not approach the user after the user comes home from work. By allowing the user to check how the virtual robot 40 does from the terminal device 12 at any time, the user can imagine the mood of the robot device 20 after coming home. It is noted that in a case where a large event occurs, the server device 10 may make a notification of the terminal device 12. The notification section 326 gives a predetermined notification to the user, so that the user can input a distribution request and immediately check how the virtual robot 40 does.

Basically, the user simply enjoys seeing the action of the virtual robot 40 from the terminal device 12 without intervening in the action of the virtual robot 40. However, the user may be allowed to slightly intervene. For example, the server device 10 holds various activities every day in the virtual world and transmits activity information called "today's robot activity" to the terminal device 12. The notification section 326 may display the activity information on the display section 328, and the user may see the activity information and make a suggestion to encourage the virtual robot 40 to participate in the activity.

This suggestion is transmitted to the server device 10 when the user speaks to the robot device 20 and the robot device 20 transmits the contents of the user's utterance resulting from language analysis to the server device 10. The server device 10 determines whether or not the virtual robot 40 accepts the user's suggestion according to the state information stored in the state information storage section 264 and/or the function information stored in the function information storage section 266. For example, in a case where the user suggests participating in "robot soccer tournament," which is one of the activities, the server device 10 determines that the virtual robot 40 cannot participate in the robot soccer tournament unless the virtual robot 40 has a soccer play function. At this time, the server device 10 may transmit voice data "I cannot participate in the soccer tournament because I do not have a soccer app" to the robot device 20 and cause the speaker 36 of the robot device 20 to output the voice data. In response, the user may install the soccer play app in the robot device 20 so that the virtual robot 40 can participate in the robot soccer tournament.

In the entertainment system 1, the virtual robot 40 always acts in the virtual world even while the user interacts with the robot device 20. Hereinafter, an example in which the virtual robot 40 participates in athletic activities will be described. It is noted that athletic activities are autonomously performed by the virtual robot 40 and do not require user intervention. Therefore, the activity contents will not be particularly described. However, the virtual robot 40 needs to pass through locked gates in order to enter the spaces in which activities take place. With the cooperation of the user, the virtual robot 40 can unlock the keys and pass through the gates.

Figure 9:
FIG. 9 is a view illustrating gates for entering spaces in which athletic activities take place.

FIG. 9 illustrates gates for entering spaces in which athletic activities take place. Here, two gates 1 and 2 are prepared. In order to unlock the key of each gate, the virtual robot 40 needs to clear a mission prepared for each gate.

(Mission 1)

A mission 1 is set at the gate 1. As the mission 1 for unlocking the key, the user passes a key to the virtual robot 40. The mission 1 is cleared when the user causes the camera 24 of the robot device 20 to capture an image of a key (a car key, a house key, or any other key is acceptable) owned by the user.

When the virtual robot 40 arrives at the gate 1, the virtual robot control section 240 generates a request from the virtual robot 40 to unlock the key of the gate 1. This request is to capture an image of the user's key with the camera 24. The virtual robot control section 240 generates voice data of the virtual robot 40 "I want a key, so please show the key to the camera," and the request transmission section 216 transmits the request from the virtual robot 40 to the robot device 20. Since this request is to request the cooperation of the user, the request may be referred to as "intervention request." The transmitted request includes mission information indicating capturing of an image of the user's key with the camera 24, and voice data "I want a key, so please show the key to the camera."

In the robot device 20, the request acquisition section 108 acquires the request from the virtual robot 40. At this time, the robot device 20 acts in the autonomous action mode. When the request acquisition section 108 acquires the request from the virtual robot 40, the mode setting section 132 switches the autonomous action mode of the robot device 20 to the collaboration action mode in which collaboration is made with the virtual robot 40. After the switch to the collaboration action mode, the mode setting section 132 sends a notification of the switch to the action determination section 134 and the control section 136. Accordingly, the action determination section 134 temporarily stops any action determination in the autonomous action mode.

It is noted that this example assumes that the main power of the robot device 20 has been on and the robot device 20 has acted in the autonomous action mode. However, since the virtual robot 40 acts independently from the robot device 20, there is a possibility that when the virtual robot 40 arrives at the gate 1, the main power of the robot device 20 is off. In the server device 10, therefore, the request transmission section 216 also includes a main power-on instruction to the robot device 20 in the request to be transmitted. When the robot device 20 in the standby mode acquires the main power-on instruction, which is included in the request from the virtual robot 40, the robot device 20 switches the main power to on and starts up. That is, when the request acquisition section 108 acquires the request from the virtual robot 40 while the robot device 20 is in the standby mode, the main power is set to on and the robot device 20 starts up automatically. When the robot device 20 starts up, the mode setting section 132 sets the collaboration action mode as the motion mode. It is noted that the robot device 20 that has already started up just needs to ignore the main power-on instruction, which is included in the request from the virtual robot 40.

When the collaboration action mode is set, the action determination section 134 determines actions corresponding to the request from the virtual robot 40. Here, the request includes the mission information indicating capturing of an image of the user's key with the camera 24, and voice data "I want a key, so please show the key to the camera." In response to the request, the action determination section 134 determines actions of turning on the camera 24 and transmitting an image captured by the camera 24 to the server device 10 and also an action of causing the speaker 36 to output the voice data. The control section 136 controls the motion of the robot device 20 such that the robot device 20 takes the actions determined by the action determination section 134. Specifically, the control section 136 causes the response transmission section 110 to transmit the image captured by the camera 24 to the server device 10 as response data, and outputs voice "I want a key, so please show the key to the camera" from the speaker 36.

The user listens to the voice output from the robot device 20 and holds the key owned by the user in front of the camera 24. The response transmission section 110 transmits the image captured by the camera 24 to the server device 10 as the user response data to the request from the virtual robot 40. In the server device 10, the response acquisition section 218 acquires the image captured by the camera 24 from the robot device 20 as the user response data. When the virtual robot control section 240 recognizes that "key" is captured in the captured image, the virtual robot control section 240 determines that the mission 1 is cleared, opens the gate 1, and allows the virtual robot 40 to pass therethrough. In this manner, the virtual robot control section 240 reflects the user's response in the motion of the virtual robot 40 in the collaboration action mode. Through the terminal device 12, the user can see the gate 1 open and the virtual robot 40 pass therethrough.

It is noted that the robot device 20 side may determine that an image of "key" has been captured by the camera 24. When the control section 136 determines that the captured image includes "key" using an object recognition function, the response transmission section 110 transmits, as the user response data, the fact that the mission 1 has been cleared. It is noted that the response transmission section 110 may transmit, as the user response data, the fact that an image of "key" has been captured. Accordingly, the virtual robot control section 240 of the server device 10 opens the gate 1 and allows the virtual robot 40 to pass therethrough. When the mission 1 is cleared, the mode setting section 132 switches the collaboration action mode of the robot device 20 to the autonomous action mode, and the robot device 20 is controlled so as to autonomously act again.

(Mission 2)

When the mission 1 is cleared, the virtual robot 40 tries athletics at the back of the gate 1. The user can see this situation from the terminal device 12. When the athletics is completed successfully, the virtual robot 40 reaches the gate 2.

A mission 2 is set at the gate 2. As the mission 2 for unlocking the key, the virtual robot 40 makes the same pose as an attendant robot at the gate 2. The mission 2 is cleared when the user lets the robot device 20 make the same pose as the attendant robot by moving the arms or the like of the robot device 20 and the pose is reflected in the virtual robot 40.

When the virtual robot 40 arrives at the gate 2, the virtual robot control section 240 generates a request from the virtual robot 40 to unlock the key of the gate 2. This request is to let the robot device 20 and the virtual robot 40 make the same pose as the attendant robot by synchronizing the motions of the robot device 20 and the virtual robot 40 with each other. The virtual robot control section 240 generates voice data of the virtual robot 40 "Please let the robot device make the same pose as the attendant," and the request transmission section 216 transmits the request from the virtual robot 40 to the robot device 20. The transmitted request includes mission information that indicates letting the robot device 20 and the virtual robot 40 make the same pose as the attendant robot by synchronizing the motions of the robot device 20 and the virtual robot 40 with each other, and the voice data "Please let the robot device make the same pose as the attendant."

In the robot device 20, the request acquisition section 108 acquires the request from the virtual robot 40. At this time, the robot device 20 acts in the autonomous action mode. When the request acquisition section 108 acquires the request from the virtual robot 40, the mode setting section 132 switches the autonomous action mode of the robot device 20 to the collaboration action mode. After the switch to the collaboration action mode, the mode setting section 132 sends a notification of the switch to the action determination section 134 and the control section 136. Accordingly, the action determination section 134 temporarily stops any action determination in the autonomous action mode.

When the collaboration action mode is set, the action determination section 134 determines actions corresponding to the request from the virtual robot 40. Here, the request includes the mission information that indicates letting the robot device 20 and the virtual robot 40 make the same pose as the attendant robot by synchronizing the motions of the robot device 20 and the virtual robot 40 with each other, and the voice data "Please let the robot device make the same pose as the attendant." In response to this request, the action determination section 134 determines an action of transmitting detection values of the rotation angle sensors, which are provided to individual motors of the driving mechanism 34, to the server device 10 and an action of causing the speaker 36 to output the voice data. The control section 136 controls the motion of the robot device 20 such that the robot device 20 takes the actions determined by the action determination section 134. Specifically, the control section 136 causes the response transmission section 110 to transmit the detection values of the rotation angle sensors to the server device 10 as response data and outputs voice "Please let the robot device make the same pose as the attendant" from the speaker 36.

When the user listens to the voice output from the robot device 20 and understands the mission 2, the user checks the pose of the attendant robot displayed on the terminal device 12. In the example illustrated in FIG. 9, the attendant robot poses with its right hand raised diagonally and its left hand lowered diagonally. The user moves the arms of the robot device 20 such that the robot device 20 makes the same pose. The response transmission section 110 transmits the detection values of the rotation angle sensors, which are provided to individual motors of the driving mechanism 34, to the server device 10 as the user response data to the request from the virtual robot 40.

In the server device 10, the response acquisition section 218 acquires the detection values of the rotation angle sensors from the robot device 20. The virtual robot information storage section 270 stores correspondence relationships between the detection values of the rotation angle sensors and the rotation angles of the motors in the robot device 20. Therefore, the virtual robot control section 240 can derive the rotation angle of each joint of the virtual robot 40 from the detection value of each rotation angle sensor. The virtual robot control section 240 changes the rotation angles of the joints of the virtual robot 40 according to the detection values of the rotation angle sensors. When the virtual robot control section 240 recognizes that the posture of the virtual robot 40 becomes the same as the pose of the attendant robot, the virtual robot control section 240 determines that the mission 2 is cleared, opens the gate 2, and allows the virtual robot 40 to pass therethrough. When the mission 2 is cleared, the mode setting section 132 switches the collaboration action mode of the robot device 20 to the autonomous action mode, and the robot device 20 is controlled so as to autonomously act again.

As described above, in the entertainment system 1, the virtual robot 40 transmits the intervention request to the robot device 20 so that the user assists the action of the virtual robot 40. In the collaboration action mode, the user deepens an attachment to the virtual robot 40 by gaining a sense of satisfaction that the virtual robot 40 relies on the user.

It is noted that while the virtual robot 40 is controlled so as to perform the same motion as the robot device 20 in the example described above, the robot device 20 may be controlled so as to perform the same motion as the virtual robot 40. For example, in a case where the virtual robot 40 participates in a boxing tournament, the virtual robot control section 240 generates a request from the virtual robot 40 to make the motions of the virtual robot 40 and the robot device 20 synchronized with each other. When the request transmission section 216 transmits the request from the virtual robot 40 to the robot device 20, the request acquisition section 108 in the robot device 20 acquires the request from the virtual robot 40.

When the request acquisition section 108 acquires the request from the virtual robot 40, the mode setting section 132 sets the motion mode of the robot device 20 to the collaboration action mode. When the collaboration action mode is set, the action determination section 134 determines actions corresponding to the request from the virtual robot 40. Here, the request includes information that indicates making the motions of the virtual robot 40 and the robot device 20 synchronized with each other. In response to the request, the action determination section 134 instructs the control section 136 to perform the actions according to motion data transmitted from the server device 10.

When the boxing tournament starts, the virtual robot control section 240 generates motion data of the robot device 20 that are synchronized with the motion of the virtual robot 40, and the motion data transmission section 220 transmits the motion data to the robot device 20. In the robot device 20, the motion data acquisition section 112 acquires the motion data and the control section 136 controls the driving mechanism 34 according to the motion data. Accordingly, the robot device 20 performs a boxing motion in front of the user in synchronization with the motion of the virtual robot 40 (however, there is no opponent). Through the terminal device 12, the user can see that the virtual robot 40 boxes. By seeing the robot device 20 punching out in front of the user, the user increases a feeling of support for the virtual robot 40. When the virtual robot 40 goes down, the robot device 20 also goes down. In a case where the robot device 20 cannot get up on its own, the user preferably helps the robot device 20 to get up.

The present invention has been described above on the basis of the embodiment. The embodiment is illustrative, and it will be understood by those skilled in the art that various modifications can be made to combinations of each component and each processing process in the embodiment and that such modifications also fall within the scope of the present invention.

In the embodiment described above, the updated state information and/or function information are immediately synchronized between the robot device 20 and the server device 10. In a modification, the updated state information and/or function information may be synchronized every predetermined time. Further, in a modification, the updated state information and/or function information in the server device 10 may not be reflected in the robot device 20 during the time between when the main power of the robot device 20 is turned on and when the main power thereof is turned off. In this case, while the robot device 20 acts, the robot device 20 is not affected by any changes made to the state values of the virtual robot 40. Therefore, while the robot device 20 plays with the user, the robot device 20 does not suddenly become violent and the user can interact with the robot device 20 in peace.

Further, while it is assumed in the embodiment that the virtual robot 40 always acts, the robot device 20 and the virtual robot 40 may be controlled such that only one of the robot device 20 and the virtual robot 40 acts. That is, the virtual robot control section 240 may perform controls so as not to allow the virtual robot 40 to act in the virtual world during the time between when the main power of the robot device 20 is turned on and when the main power thereof is turned off, and so as to allow the virtual robot 40 to act in the virtual world only during the time between when the main power of the robot device 20 is turned off and when the main power thereof is turned on.

While FIG. 5 illustrates the internal states of emotion, personality, and action characteristics as the state information, other state information such as physical conditions may be included.

For example, a parameter of "caught a cold" may be prepared as a parameter of physical conditions and the motions of the virtual robot 40 and the robot device 20 may be restricted according to the severity of the cold. When the virtual robot 40 catches a cold from another virtual robot, controls may be performed such that the motion of the virtual robot 40 is slowed down and the motion of the robot device 20 is also slowed down similarly. Although a cold heals over time, the virtual robot 40 may recover from a cold by the user giving a cold medicine to the virtual robot 40. Similarly, when a part of the body of the virtual robot 40 is injured, the corresponding part of the robot device 20 may be made unmovable. For example, the function value of an app such as a dance app that involves body movements may be automatically updated to off because a part of the body is unmovable.

REFERENCE SIGNS LIST

1 . . . Entertainment system, 10 . . . Server device, 12 . . . Terminal device, 20 . . . Robot device, 40 . . . Virtual robot, 100 . . . Input/output interface, 102 . . . Update information transmission section, 104 . . . Update information acquisition section, 106 . . . Application acquisition section, 108 . . . Request acquisition section, 110 . . . Response transmission section, 112 . . . Motion data acquisition section, 120 . . . State management section, 122 . . . State determination section, 124 . . . Update section, 126 . . . Synchronization section, 130 . . . Action management section, 132 . . . Mode setting section, 134 . . . Action determination section, 136 . . . Control section, 150 . . . State information storage section, 152 . . . Function information storage section, 154 . . . Application storage section, 156 . . . Action program storage section, 200 . . . Communication section, 210 . . . Input/output interface, 212 . . . Update information transmission section, 214 . . . Update information acquisition section, 216 . . . Request transmission section, 218 . . . Response acquisition section, 220 . . . Motion data transmission section, 222 . . . Image request acquisition section, 224 . . . Image distribution section, 230 . . . State management section, 240 . . . Virtual robot control section, 250 . . . Image processing section, 260 . . . Storage device, 262 . . . Individual information storage section, 264 . . . State information storage section, 266 . . . Function information storage section, 268 . . . User information storage section, 270 . . . Virtual robot information storage section, 280 . . . Action program storage section, 282 . . . Virtual space model storage section, 300 . . . Communication section, 310 . . . Processing section, 320 . . . Image request transmission section, 322 . . . Image acquisition section, 324 . . . Image output section, 326 . . . Notification section, 328 . . . Display section.

INDUSTRIAL APPLICABILITY

The present invention can be used in the field of robotics.

The invention claimed is:

1. An entertainment system comprising:
a robot device capable of acting in an autonomous action mode in a real world, the robot device comprising:
a request acquisition section configured to acquire a request from a virtual robot associated with the robot device, the virtual robot being in a virtual world;
a mode setting section configured to, when the request acquisition section acquires the request from the virtual robot, set a collaboration action mode in which collaboration is made with the virtual robot;
an action determination section configured to, when the collaboration action mode is set, determine an action corresponding to the request from the virtual robot; and
a control section configured to control a motion of the robot device such that the robot device takes the action determined by the action determination section;
a server device configured to create the virtual world in which a virtual robot associated with the robot device autonomously acts; and
a terminal device capable of displaying an image of the virtual world in which the virtual robot acts, wherein
the server device provides the image of the virtual world to the terminal device, and
the server device transmits a request from the virtual robot to the robot device.

2. The entertainment system according to claim 1, wherein the server device creates the virtual world in which a plurality of virtual robots acts and communicates with each other in a meeting with each other.

3. A robot device capable of acting in an autonomous action mode, the robot device comprising:
a request acquisition section configured to acquire a request from a virtual robot associated with the robot device, the virtual robot being in a virtual world;
a mode setting section configured to, when the request acquisition section acquires the request from the virtual robot, set a collaboration action mode in which collaboration is made with the virtual robot;
an action determination section configured to, when the collaboration action mode is set, determine an action corresponding to the request from the virtual robot; and
a control section configured to control a motion of the robot device such that the robot device takes the action determined by the action determination section.

4. The robot device according to claim 3, further comprising:
a state management section configured to manage state information regarding a personality of the robot device, wherein
the action determination section determines an action of the robot device according to the state information in the autonomous action mode.

5. The robot device according to claim 4, wherein the state management section synchronizes the managed state information with state information of the virtual robot.

6. The robot device according to claim 3, wherein when the request acquisition section acquires the request from the virtual robot while the robot device acts in the autonomous action mode, the mode setting section switches the autonomous action mode to the collaboration action mode.

7. The robot device according to claim 3, wherein when the request acquisition section acquires the request from the virtual robot while the robot device is in a standby mode, the robot device starts up automatically and the mode setting section sets the collaboration action mode.

8. A server device that causes a virtual robot associated with a robot device in a real world to act in a virtual world, the server device comprising:
- a request transmission section configured to transmit a request from the virtual robot to the robot device;
- a response acquisition section configured to acquire a user response from the robot device; and
- a virtual robot control section configured to reflect the user response in a motion of the virtual robot, wherein the robot device comprises:
- a request acquisition section configured to acquire the request from a virtual robot associated with the robot device, the virtual robot being in the virtual world;
- a mode setting section configured to, when the request acquisition section acquires the request from the virtual robot, set a collaboration action mode in which collaboration is made with the virtual robot;
- an action determination section configured to, when the collaboration action mode is set, determine an action corresponding to the request from the virtual robot; and
- a control section configured to control a motion of the robot device such that the robot device takes the action determined by the action determination section.

9. The server device according to claim 8, further comprising:
- a state management section configured to manage state information regarding a personality of the virtual robot, wherein the virtual robot control section causes the virtual robot to act according to the state information.

10. The server device according to claim 9, wherein the state management section synchronizes the managed state information with state information of the robot device.

* * * * *